(No Model.) 2 Sheets—Sheet 1.
C. BROWN.
ELECTRIC CAR.
No. 493,969. Patented Mar. 21, 1893.
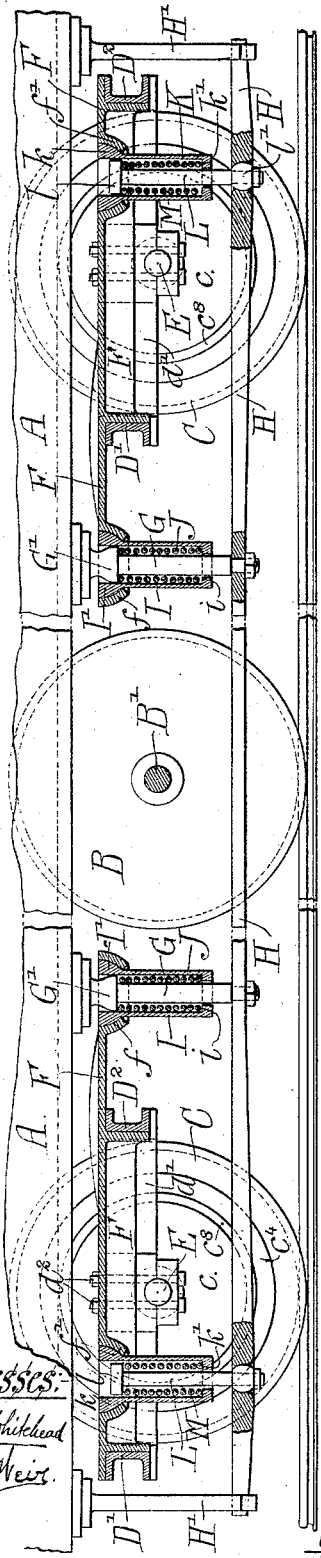
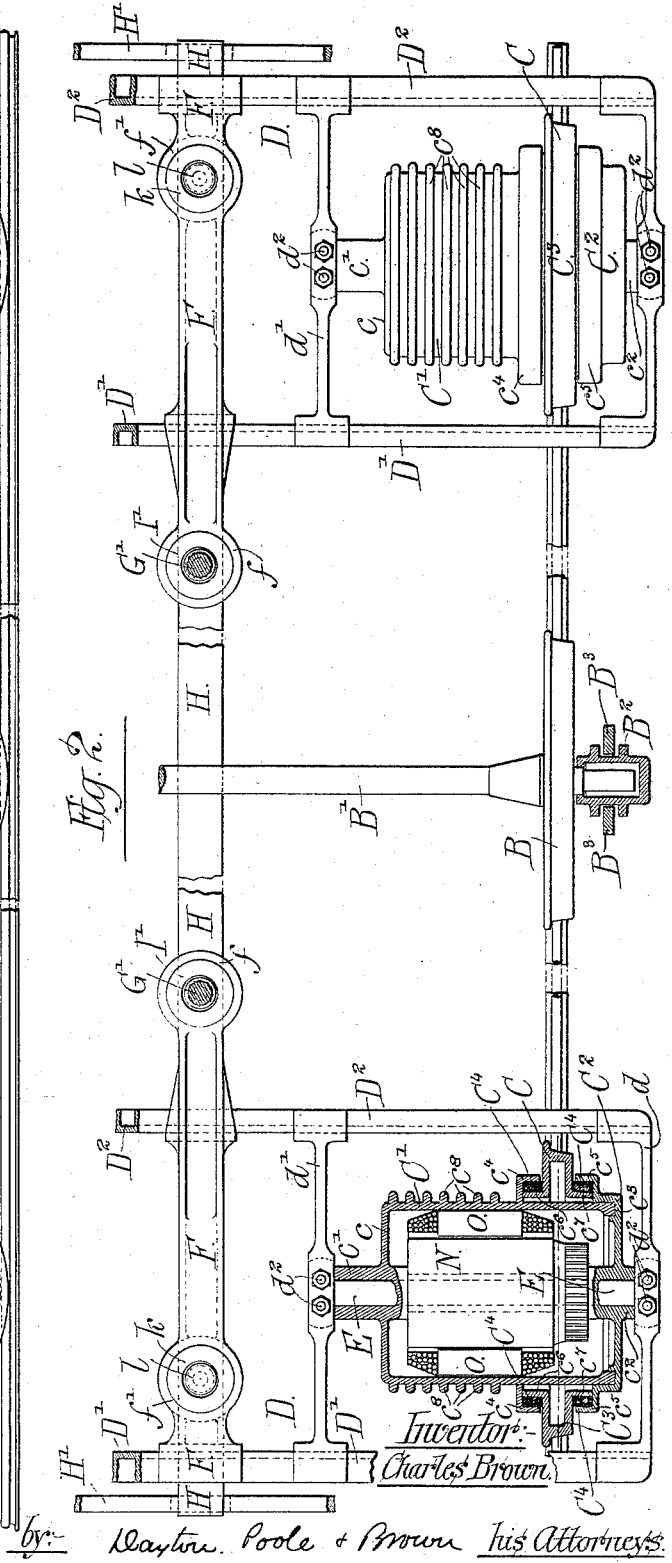
Witnesses:
Louis M. Whitehead
J. B. Weir
Inventor:
Charles Brown
by Dayton, Poole & Brown his Attorneys (No Model.) 2 Sheets—Sheet 2.
C. BROWN.
ELECTRIC CAR.
No. 493,969. Patented Mar. 21, 1893.
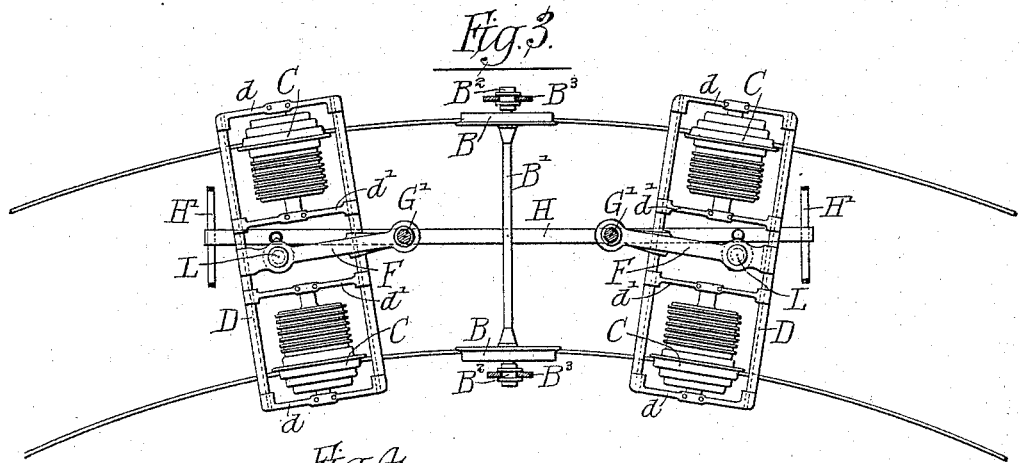
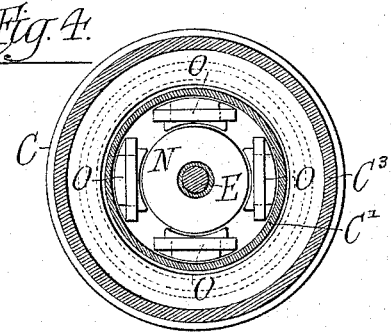
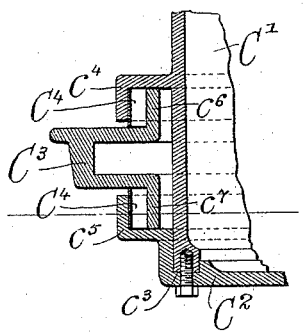
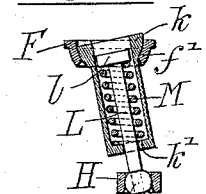
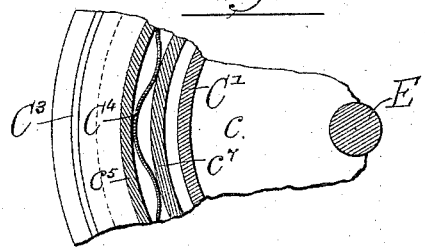
Witnesses:—
Louis M. F. Whitehead.
J. B. Weir.
Inventor:—
Charles Brown
by:— Clayton Poole & Brown
his Attorneys

UNITED STATES PATENT OFFICE.

CHARLES BROWN, OF BASLE, SWITZERLAND, ASSIGNOR TO THE MASCHINENBAU GESELLSCHAFT, OF SAME PLACE.

ELECTRIC CAR.

SPECIFICATION forming part of Letters Patent No. 493,969, dated March 21, 1893.

Application filed March 8, 1892. Serial No. 424,190. (No model.) Patented in France June 19, 1891, No. 214,283, and in Belgium August 29, 1891, No. 96,205.

*To all whom it may concern:*

Be it known that I, CHARLES BROWN, a British subject, residing in Basle, Switzerland, have invented certain new and useful Improvements in Electric Cars, (for which I have obtained Letters Patent in France, No. 214,283, dated June 19, 1891, and in Belgium, No. 96,205, dated August 29, 1891;) and I do hereby declare that the following is a full, clear, and exact description thereof, reference being had to the accompanying drawings, and to the letters of reference marked thereon, which form a part of this specification.

This invention relates to electric railway cars, and more especially to the construction of the supporting wheels of such cars and means for connecting the same with the cars and to the arrangement of the electric motors with relation to the wheels which are driven thereby.

A car embodying the main features of my invention is provided with a central axle carrying two wheels arranged in the usual manner, and at its ends with separate swinging trucks each carrying two wheels journaled in the opposite sides thereof, independently of each other, each truck being connected with the car so as to swing about a vertical pivot located at a point between the central axis of the truck wheels and the center of the car. The intermediate or central wheels are supporting wheels while the wheels which are mounted independently on the frames or trucks are each actuated separately by an electric motor so that each truck wheel is both a supporting and a driving wheel. In connection with wheels which are independently driven each by a separate motor I employ a novel construction in which the wheels turn upon a stationary journal, to which journal the armature of the motor is attached while the field magnet of the motor is secured to the wheel itself, the parts composing the motors being inclosed in a cylindric shell or case forming part of the wheel itself, as will be hereinafter more fully set forth.

The invention consists in the matters hereinafter described and pointed out in the claims.

In the accompanying drawings: Figure 1 is a vertical longitudinal section of a running-gear for cars embodying my improvements. Fig. 2 is a top plan view of one side of the same, one of the driving wheels and its motor being shown in horizontal section. Fig. 3 is a plan showing the positions of the respective trucks with relation to each other and to the frame, when on a curve. Fig. 4 is a vertical transverse section through one of the wheels at the tread. Fig. 5 is a sectional detail showing the manner of connecting the wheel tires. Fig. 6 is a sectional detail taken at right angles to that shown in Fig. 5, showing one form of supporting spring. Fig. 7 is a sectional detail of the front or outer connection between the truck and frame.

As shown in the accompanying drawings, which illustrate one practical form of car embodying the several features of my invention, A, (Fig. 1) indicates the lower part or bottom of the car body.

B is one of two supporting wheels, symmetrically located on opposite sides of the car at the middle thereof, longitudinally, said wheels being preferably secured on an axle, B', which is mounted in vertically movable boxes, one only of which, $B^2$, is shown in the drawings. These movable boxes are maintained in proper operative position by means of guide brackets, $B^3$, between which and the car body are located supporting springs in the usual manner.

C C are wheels mounted in frames or trucks D D located at opposite ends of the car, said wheels serving both as supporting and driving wheels. Each truck D is provided with two wheels only, arranged at opposite sides of the truck and the wheels in each truck being arranged with their axes of rotation in alignment with each other and being mounted in the truck so as to turn independently of each other or without any connecting axle.

The truck frames D D are pivotally connected with the car body in such manner as to swing about vertical axes located at points between the axes of rotation of the truck wheels and the longitudinal center of the car, these pivotal points being located midway between the said central axes of the truck wheels and the center of the car. The object of this general arrangement of the running gear is to enable the car to easily and smoothly traverse curves of different radii and to easily pass from a straight track to a curve, or vice versa, or to pass over a reversed curve. In passing a curve the central fixed wheels obviously maintain the car body centrally over the track and hold the same from lateral movement while the pivoted trucks are swung about their vertical pivots in such manner as to maintain the axes of the truck wheels practically in alignment with radial lines of the curve. The position of the parts in traversing a curve is more clearly shown in Fig. 3 from which it will be seen that while the axle of the center wheels remains on a radius of the curve the trucks and truck wheels have been shifted laterally to conform to the curve while the axes of the truck wheels are also on substantially radial lines.

Each of the driving wheels C C which, as before stated, are mounted independently in the truck frames, is provided with a separate electric motor to which the necessary electric conductors are connected, so that each of said wheels is independently driven or actuated and no driving connection is required between the wheels themselves or between either of the wheels and the car body.

To first describe the truck frames and the means by which they are connected with the car body, said parts are constructed as follows: Each truck frame consists principally of two parallel horizontal beams $D'$ $D^2$ extending cross-wise to the car and forming the end frame pieces of the truck, transverse pieces $d$ $d$ connecting the ends of the main frame pieces at the sides of the truck, and other pieces $d'$ $d'$ located between the end pieces $d$ and the center line of the truck frame.

E. E. are stationary axles on which the wheels C C are mounted, said axles being secured at their opposite ends in the frame pieces $d$ $d'$. The axles E E may be secured at their ends in any suitable way in the frame pieces, but as herein shown the ends of the axles are inserted in apertures in the frame pieces and are held therein by means of pins $d^2$ $d^2$ by which the axles are positively held from turning in the frame pieces.

F F indicate rigid arms extending inwardly from the truck frames and affording pivotal connection between the said truck frames and the car body. In the particular construction shown a rigid connection between the arms and the truck frames is afforded by extending the arms across the frames and securing them to both of the frame pieces $D'$ $D^2$ in the manner clearly shown in the drawings. The said arm when made of metal, as herein shown, will be provided with suitable longitudinal flanges, giving stiffness and rigidity to the same.

Pivotal connection between the inner end of each of the arms F and the car body is provided as follows: G is a rigid depending stud or post attached to the bottom of the car and extending downwardly to form the pivotal support for the said arm F. Said pivot stud is attached at its lower end to a longitudinal bar H which extends lengthwise of the car beneath the truck frames and the ends of which are attached to rigid depending brackets H' secured to the car body outside of the truck frames, said bar being employed for a purpose hereinafter stated, but serving incidentally to brace the lower end of the stud G. Surrounding the pivot stud G is a tube or hollow sleeve I which is somewhat larger in internal diameter than the main part of the pivot stud but which fits at its upper end upon an enlargement or collar G' formed at the upper end of the said stud. The sleeve I is provided at its upper end with an enlargement or head I' having the form of a spherical segment and which is arranged to fit within a socket $f$ in the end of the truck arm F, which socket is also made spherical in internal form to fit the shape of the head I'. The sleeve I is closed at its lower end and centrally apertured for the passage of the pivot stud G, thereby forming a shoulder $i$ and between the said shoulder $i$ and the shoulder formed by the enlargement G' on the stud is located a spirally coiled spring J. The head I' on the sleeve I and the socket $f$ on the truck arm constitute in effect a ball and socket joint affording universal movement of the truck frame with relation to the car body, while the spring J, located between the shoulders on the pivot stud and on the lower end of the sleeve I, serves to transmit to the truck a part of the weight of the car.

The obvious advantage gained by the use of a universal joint between the truck frame and the car body is that the truck frame is thereby not only given freedom to swing laterally but may also move freely in other directions as may be required from inequality of the the track or from other causes, without transmitting undue strain to the car body. For example, when the car enters upon a curve, the forward truck must not only swing laterally, but must tip somewhat out of the horizontal to accommodate the elevation universally given to the outer rail of a curve. By providing a universal joint at the pivotal point of the truck, such tipping movement as well as the lateral movement may take place without undue friction or liability of breaking the parts, even when the axles of the truck-wheels are rigidly secured to the truck.

For the purpose of affording proper connection between the car body and the outer parts of the truck frames devices are provided as follows: In each truck frame, at points outside of the central axes of the truck wheels, are located sockets $f'$ $f'$ which, in the construction shown, are conveniently formed in the inner parts of the arms F F.

K is a sleeve which is provided at its upper end with an enlargement or head $k$ the outer surface of which has the form of a spherical segment and fits within the socket $f'$ in such manner that the sleeve K depends from the truck frame.

L is a rod which is pivotally connected at its lower end with the longitudinal bar H, hereinbefore referred to, and passes upwardly through the sleeve K. At its upper end said rod L is provided with a head $l$, and the sleeve K is closed at its lower end and has a central aperture through which the rod L passes thereby forming a shoulder $k'$. Between the head $l$ of the rod and the shoulder $k'$ of the sleeve is located a spirally coiled spring M. The pivotal connection between the rod L and the bar H is one adapted to give universal movement to the rod, that shown consisting of a spherical or rounded head $l'$ on the rod fitting a socket in the bar H, adapted to receive the same as clearly seen in the drawings, Fig. 1. The spring M, arranged as described, obviously serves to transmit to the truck frame a part of the weight of the car, the said rod L having a positive swiveling connection with the car frame through the medium of the bar H and the bracket H' so that a part of the weight of the car is transmitted to the outer part of the truck frame through the medium of said spring. Said spring, however, not only serves to yieldingly support the car but is also adapted to yield in such manner as to allow the truck to swing sidewise or laterally, it being obvious that when the truck frame is shifted from its central position when the car is passing around a curve the rod L will assume an inclined position, as clearly seen in Fig. 7, and the spring will be compressed. It is further obvious that the spring when so compressed by the lateral shifting of the truck frame will by its expansive action tend to draw the truck frame back to its central position. The pivoted or swinging truck frames therefore, will be held from lateral movement and will have no tendency to lateral displacement when the car is running on a straight track and the trucks will only be shifted laterally by the action of the flanges of the truck wheels on the rails in passing around curves. The universal joint formed by the head $k$ on the sleeve K and the socket $f'$ obviously affords the necessary movement of the said sleeve when the truck frame is shifted laterally, in the manner above described, while at the same time said universal joint in connection with the universal joint between the end of the truck arm F and the car affords a desirable freedom of movement between the truck as a whole and the car body to allow the wheels to adjust themselves to inequalities of the track independently of the position of the body of the car.

It is obvious that in the particular construction shown the car body is sustained at six points of support, two of such points of support being the bearings of the central wheels which are located at the sides of the car, and the other four being the connections with the end trucks which are located at the central longitudinal line of the car near the ends thereof. It follows that in this construction the car is held in its upright position or prevented from tipping sidewise mainly by the central wheels while the end trucks afford proper support for the ends of the car. The central wheels, therefore, in this construction have a two-fold function inasmuch as by preventing lateral movement of the car body with reference to the track they serve to hold the car body centrally over the track and they also serve to maintain the car in its upright position notwithstanding the fact that the end trucks are connected with the car body by universal joints located at the central longitudinal line of the car.

It will of course be understood that the weight of the car acts downwardly on each of the trucks through the medium of the springs J and M, which are situated on opposite sides of the axle E, the truck frames being free to swing on the said axle so as to bring part of the weight on each of said springs.

The parts constituting the driving wheels and motors which actuate the same are constructed as follows: Each electric motor consists of an armature N which is rigidly affixed to the fixed axle E, and field magnets O O which surround the armature N and are secured within a cylindric shell or casing C' which constitutes the central part or body of the wheel C said armature and field magnets being secured in operative position in any approved or desired manner. Each wheel is formed in effect by three parts, to wit, the cylindric shell C' above referred to, which shell is provided at its inner end with a flat end wall $c$, a circular casting or head $C^2$ which constitutes an outer end wall closing the outer end of the shell C', and an annular part or rim $C^3$ which surrounds the shell C' and forms the tread of the wheel. The shell C' is provided at its inner end with a hub $c'$ having a bearing aperture which engages the inner end of the axle E while the head $C^2$ is similarly provided with a hub $c^2$ having a bearing aperture engaging the outer end of said axle. The inner face of the head $C^2$ is preferably provided with an annular groove $c^3$ in which the open end of the cylindric part or body of the shell is seated and secured.

The rim $C^3$ is connected with the shell C' by devices constructed as follows: An annular flange $c^4$ of L-shape in cross-section is cast upon the shell C' and a similar L-shaped flange $c^5$ is formed upon the margin of the head $C^2$ which overlaps the end of the shell, the outer or cylindric parts of said flanges $c^4$ $c^5$ being arranged to extend toward each other, with an annular space or slot between their adjacent edges. The flanges constructed as described form in effect a T-shaped groove extending around the shell C'. The wheel rim $C^3$ is adapted to enter between the adjacent margins of the flanges $c^4$ $c^5$ and is provided at its inner margin with inwardly and outwardly extending cylindric flanges $c^6$ $c^7$, these parts being so arranged that when placed together the flanges $c^4\ c^5$ of the shell overhang the flanges $c^6\ c^7$ of the wheel rim. Between the said flanges on the shell and the wheel rim are located springs $C^4$ which serve to hold the rim concentrically in position with reference to the shell while at the same time affording a spring or yielding connection between the parts to prevent the transmission of shock or jar from the rim of the wheel to the motor within the shell. As shown in Fig. 2 the spring $C^4$ consists of a rubber ring inserted between the parts, but the same result may be produced by springs of other form, such for instance as the corrugated or sinuous metal plate spring shown in Figs. 5 and 6. As herein shown, the rim $C^3$ of the wheel is made hollow in its main part or body, but it may be made solid or otherwise constructed with the same general result. The internal diameter of said rim $C^3$ is of course greater than the external diameter of the shell so that the necessary freedom of motion between the parts will be afforded to make effective the spring between them, the shell or body of the wheel being in effect suspended within the rim so that the weight coming on the wheel is sustained between that part of the spring which rests between the upper parts of the flanges $c^4\ c^5$ and the flanges of the rim beneath the same. The exterior surface of the cylindric part or shell $C'$ of the wheel is provided with a series of ribs or projections $c^8$ designed to dissipate the heat which may be produced by the operation of the motor, or, in other words, to facilitate cooling of the field magnets.

An obvious advantage gained by the use of independently mounted driving wheels each actuated by a separate motor is that in this construction each motor and wheel does its work independently of the other motors and wheels, so that in no instance is there a tendency for one wheel to accelerate or retard the motion of the other, as occurs with rigidly connected wheels as ordinarily constructed, in passing around curves and under other circumstances, as for example, when one wheel maintains a better grip on the rail than another.

When independent wheels and separate motors are employed the wheel on the outermost track in passing around a curve will obviously turn faster or make a greater number of rotations than the innermost wheel, so that there will be no slipping of either wheel on the track at such times, and both wheels will properly perform their work in moving the vehicle.

A special advantage is gained by the employment of separate driving wheels and motors in connection with trucks arranged and operating as described, owing to the fact that the swinging of the truck will maintain the axis of rotation of each wheel practically at right angles to the part of the track on which the wheel rests, while at the same time each side of each truck is positively advanced along the part of the track on which it rests so that the car will be smoothly and uniformly carried around curves with a minimum of wear on the driving wheels and rails.

I claim as my invention—

1. A car provided at its center with two wheels which are without lateral movement relatively to the car body and at its ends with two separate truck frames each carrying two wheels, each of said truck frames being pivotally connected with the car by means of a pivotal connection located between and equidistant from the axis of rotation of the truck wheels and the axis of rotation of the wheels at the center of the car; and means connecting the car body with the said truck frames outside of the axles of the truck wheels, comprising upright supporting members pivotally connected with the car body and trucks to allow lateral movement of the said frame, substantially as described.

2. The combination with a car body, of central supporting wheels and truck frames located at the ends of the car body and each provided with two wheels, said truck frames being pivoted to the car body at points between the axes of rotation of the truck wheels and the center of the car, springs located between the truck frames and the car body at the points of pivotal connection between the same for supporting a part of the weight of the car, and other springs applied between the truck frames and the car body at points outside of the axis of rotation of the wheels and acting both to sustain a part of the weight of the car and to hold the truck frames normally in a central position relatively to the car body, substantially as described.

3. The combination with a car body, of a laterally movable truck provided with two wheels and connected with the car body by a vertical pivot located at one side of the axis of rotation of the truck wheels, and an elastic or yielding connection between the car body and the truck frame consisting of two parts constructed to slide longitudinally one upon the other and connected at their opposite ends with the car body and truck frame by universal joints, and a spring interposed between the sliding parts of said connection tending to hold the truck frame in its central position, substantially as described.

4. The combination with the car body, of a truck frame having two wheels and pivotally connected with the car body at a point at one side of the axis of rotation of the wheels, a rigid bar attached to the car body and extending longitudinally beneath the truck frame, and an elastic or yielding connection between said longitudinal bar and the truck frame, substantially as described.

5. The combination with a car body, of a truck frame having two wheels and pivotally connected with the car body at a point at one side of the axis of rotation of the wheels, a rigid bar attached to the car body and extending longitudinally beneath the truck frame, an elastic or yielding connection between said longitudinal bar and the truck frame, consisting of two parts having longitudinal movement with reference to each other, said parts being connected at their ends with the longitudinal bar and the truck frame by universal joints, and a spring interposed between said longitudinally movable parts, substantially as described.

6. The combination with a car body, of two centrally arranged wheels, and two laterally movable truck frames located at opposite ends of the body and each provided with two wheels, said truck frames being each pivotally connected with the car body by universal joints located at points between and equidistant from the axis of rotation of the truck wheels and the axis of rotation of the wheels at the center of the car, substantially as described.

7. The combination with a car body, of a truck frame having two wheels, and a pivotal connection between the truck frame and car body located at one side of the axis of rotation of the truck wheels and consisting of a depending pivot stud attached to the car body, a sleeve surrounding the same and connected with the truck frame by a universal joint, and a spring interposed between the shoulders on the said stud and the said sleeve, substantially as described.

8. The combination with a car body, of a truck frame provided with two wheels, a pivotal connection between the truck frame and car body located at a point at one side of the axis of rotation of the wheels and embracing a universal joint, and a spring interposed between the car body and the truck frame and acting both to hold the truck frame normally in a central position and to sustain a part of the weight of the car body, substantially as described.

9. The combination with a car body, of a truck frame provided with two wheels and pivotally connected with the car body at a point at one side of the axis of rotation of the wheels, a rigid bar attached to the car body and extending longitudinally beneath the truck frame, and an elastic or yielding connection between said longitudinal bar and the truck frame consisting of a rod pivotally connected with said bar at its lower end, a sleeve surrounding the rod and connected with the truck frame by a universal joint, and a spring located between opposing shoulders on the rod and sleeve, substantially as described.

10. The combination with a car body, of central supporting wheels which are without lateral movement relatively to the car body, truck frames located at the ends of the car and pivotedly connected with the same, two fixed axles attached to each truck frame, one at each side thereof, wheels independently mounted on each of said axles and an electric motor for each wheel, of which the stationary part is attached to the fixed axle, and the revolving part is attached to the wheel, the pivots connecting with the truck frames and the car being located midway between the axis of rotation and the wheel at the center of the car and those of the truck wheels, substantially as described.

11. The combination with a driving wheel provided with an outer part or rim made separate from the body of the wheel, of a motor for actuating the same, the revolving part of which is attached to the body of the wheel, and a spring or cushion interposed between the outer part or rim and the body of the wheel, substantially as described.

12. The combination with a driving wheel comprising a cylindric shell forming the body of a wheel and a wheel rim surrounding the shell, of a motor for driving the wheel, the revolving part of which is attached to the inner surface of the shell, and an elastic packing or spring interposed between the wheel rim and the shell, substantially as described.

In testimony that I claim the foregoing as my invention I affix my signature in presence of two witnesses.

CHARLES BROWN.

Witnesses:
CLARENCE H. GIFFORD,
GEORGE GIFFORD.